United States Patent
Miao et al.

(10) Patent No.: US 11,641,626 B2
(45) Date of Patent: May 2, 2023

(54) MONITORING POWER SAVING SIGNAL AT A RESOURCE INDICATED BY RECEIVED CONFIGURATION INFORMATION OF POWER SAVING SIGNAL

(71) Applicant: DATANG MOBILE COMMUNICATIONS EQUIPMENT CO., LTD., Beijing (CN)

(72) Inventors: Jinhua Miao, Beijing (CN); Meiying Yang, Beijing (CN); Jing Fu, Beijing (CN); Meng Xu, Beijing (CN); Jing Liang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/277,181

(22) PCT Filed: Sep. 18, 2019

(86) PCT No.: PCT/CN2019/106422
§ 371 (c)(1),
(2) Date: Mar. 17, 2021

(87) PCT Pub. No.: WO2020/057545
PCT Pub. Date: Mar. 26, 2020

(65) Prior Publication Data
US 2022/0015034 A1     Jan. 13, 2022

(30) Foreign Application Priority Data
Sep. 18, 2018   (CN) .......................... 201811090238.2

(51) Int. Cl.
*H04W 52/02* (2009.01)
*H04W 72/00* (2009.01)
*H04W 72/04* (2023.01)

(52) U.S. Cl.
CPC ... *H04W 52/0235* (2013.01); *H04W 52/0212* (2013.01); *H04W 52/0261* (2013.01); *H04W 72/005* (2013.01); *H04W 72/042* (2013.01)

(58) Field of Classification Search
CPC ......... H04W 52/0212; H04W 52/0216; H04W 52/0219; H04W 52/0229; H04W 52/0235;
(Continued)

(56) References Cited

U.S. PATENT DOCUMENTS

| 2016/0127997 A1* | 5/2016 | Ang ...................... H04L 1/1812 370/311 |
| 2016/0198408 A1* | 7/2016 | Jhang .................... H04L 1/1848 370/311 |

(Continued)

FOREIGN PATENT DOCUMENTS

| CN | 101355382 A | 1/2009 |
| CN | 105744591 A | 7/2016 |

(Continued)

OTHER PUBLICATIONS

International Search Report from PCT/CN2019/106422, dated Dec. 18, 2019, with English translation from WIPO, all pages.

(Continued)

*Primary Examiner* — Andrew Wendell
(74) *Attorney, Agent, or Firm* — Ladas & Parry, LLP

(57) ABSTRACT

A method of monitoring a power saving signal, a method of configuring a power saving signal, a terminal, and a network-side device are provided. The method includes: receiving configuration information of a power saving signal, the configuration information being at least used to indicate a resource location of the power saving signal; monitoring the power saving signal at the resource location indicated by the configuration information.

16 Claims, 7 Drawing Sheets

(58) Field of Classification Search
CPC ........... H04W 52/0261; H04W 52/028; H04W 72/005; H04W 72/042; Y02D 30/70
See application file for complete search history.

(56) References Cited

U.S. PATENT DOCUMENTS

| | | | |
|---|---|---|---|
| 2017/0367030 A1 | 12/2017 | Liu et al. | |
| 2018/0007734 A1 | 1/2018 | Kela et al. | |
| 2018/0027495 A1 | 1/2018 | Song et al. | |
| 2019/0174447 A1 | 6/2019 | Liu et al. | |
| 2020/0092814 A1* | 3/2020 | Zhou | H04L 5/0053 |
| 2020/0178172 A1* | 6/2020 | Thangarasa | H04W 76/28 |
| 2021/0144646 A1* | 5/2021 | Xu | H04W 52/028 |
| 2021/0307031 A1* | 9/2021 | Chen | H04W 28/02 |
| 2021/0321333 A1* | 10/2021 | Miao | H04L 5/0053 |
| 2021/0368444 A1* | 11/2021 | Wang | H04W 72/0446 |
| 2022/0110057 A1* | 4/2022 | Wang | H04W 52/0216 |

FOREIGN PATENT DOCUMENTS

| | | |
|---|---|---|
| CN | 108307495 A | 7/2018 |
| CN | 108347766 A | 7/2018 |
| WO | 2018031327 A1 | 2/2018 |

OTHER PUBLICATIONS

Written Opinion of the International Searching Authority from PCT/CN2019/106422, dated Dec. 18, 2019, with English translation from WIPO, all pages.

International Preliminary Report on Patentability from PCT/CN2019/106422, dated Mar. 23, 2021, with English translation from WIPO, all pages.

Qualcomm Incorporated, "Wake-up signal configurations and procedures", R1-1718141, 3GPP TSG RAN WG1 Meeting #90bis, Prague, Czechia, Oct. 9-13, 2017, all pages.

Qualcomm Incorporated, "Further discussion on WUS configurations and procedures", R1-1802332, 3GPP TSG RAN WG1 Meeting #92, Athens, Greece, Feb. 26-Mar. 2, 2018, all pages.

Extended European Search Report from corresponding EP app. No. 19862149.2, dated Oct. 22, 2021, all pages.

* cited by examiner

MONITORING POWER SAVING SIGNAL AT A RESOURCE INDICATED BY RECEIVED CONFIGURATION INFORMATION OF POWER SAVING SIGNAL

CROSS-REFERENCE TO RELATED APPLICATIONS

This application is a U.S. national phase application of a PCT Application No. PCT/CN2019/106422 filed on Sep. 18, 2019, which claims priority to Chinese Patent Application No. 201811090238.2 filed in China on Sep. 18, 2018, the disclosures of which are incorporated in their entireties by reference herein.

TECHNICAL FIELD

The present disclosure relates to the field of communications technology, in particular, relates to a method of monitoring a power saving signal, a method of configuring a power saving signal, a terminal, and a network-side device.

BACKGROUND

In order to solve the problem of high power consumption of a terminal device, a concept of a power saving signal is introduced in subsequent research. In the related art, there are following two power saving schemes. The terminal device judges whether a power saving signal is a power saving signal corresponding to the terminal device by detecting the power saving signal and performing correlation matching, for example, the power saving signal may be a WUS (Wake up signal).

Scheme 1: a terminal periodically receives a power saving signal. The terminal monitors the power saving signal according to a configured period, such as a DRX (Discontinuous Reception) period or an SPS (Semi-Persistent Scheduling) period. If the terminal receives a power saving signal corresponding to the terminal, the terminal will keep monitoring a PDCCH (Physical Downlink Control Channel) after receiving the power saving signal, wherein, N is an integer greater than or equal to 1. If the terminal fails to receive the power saving signal corresponding to itself, the terminal will enter a power saving state, that is, will no longer monitor the PDCCH.

Scheme 2: the terminal determines whether to monitor the PDCCH according to an indication of the power saving signal. In this case, the terminal needs to monitor the power saving signal all the time, since a power consumption of the terminal for monitoring the power saving signal is very low. When the power saving signal corresponding to the terminal is detected by the terminal, the terminal will monitor the PDCCH. Thereafter, the terminal enters the power saving state, that is, does not monitor the PDCCH any longer.

To sum up, when the terminal is monitoring the power saving signal, the terminal cannot obtain which power saving signal needs to be monitored and where the power saving signal is specifically located, so the terminal will not be able to perform a monitoring operation of a power saving signal. Briefly, the problem of how a terminal receives a power saving signal, such as when to receive the power saving signal and where to receive the power saving signal, cannot be solved in the related art.

SUMMARY

An objective of the present disclosure is to provide a method of monitoring a power saving signal, a method of configuring a power saving signal, a terminal and a network-side device, so as to solve the problem of resource waste caused by the terminal failing to accurately receive the power saving signal in the related art.

In order to address the above problem, a method of monitoring a power saving signal is provided. The method is performed by a terminal, the method includes receiving configuration information of a power saving signal, wherein the configuration information is at least used for indicating a resource location of the power saving signal; monitoring the power saving signal at the resource location indicated by the configuration information.

The method further includes: determining whether to monitor a downlink control channel according to whether the power saving signal is monitored.

Receiving the configuration information of the power saving signal includes: receiving a broadcast message sent by the network-side device, wherein the broadcast message includes the configuration information of the power saving signal.

Before receiving the broadcast message sent by the network-side device, the method further includes: sending a request message to the network-side device, wherein the request message is used for requesting the network-side device to send the configuration information of the power saving signal.

The request message is a preamble and/or a data packet.

Receiving the configuration information of the power saving signal includes: receiving a dedicated signaling sent by the network-side device, wherein the dedicated signaling includes the configuration information of the power saving signal.

Before receiving the dedicated signaling sent by the network-side device, the method further includes: receiving a first capability request message sent by the network-side device; reporting a power saving capability of the terminal to the network-side device according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

The configuration information of the power saving signal includes at least one of following: time-domain location information of transmission of a power saving signal; a time offset between a monitoring position of the power saving signal and a system frame number 0 and/or a slot start position; a transmission duration of a power saving signal; a timing advance between a monitoring position of the power saving signal and a monitoring position of a downlink control channel; frequency-domain position information of transmission of the power saving signal; an effective time duration of the power saving signal; a duration of monitoring the downlink control channel.

The configuration information of the power saving signal further includes at least one of following: identification information of the power saving signal; a cell group identification list to which the configuration information is applicable; a distribute unit identification list to which the configuration information is applicable; a minimum threshold value of a signal quality of an effective power saving signal.

A method of configuring a power saving signal is further provided. The method is performed by a network-side device, and the method includes: sending configuration information of a power saving signal, wherein the configuration information is at least used for indicating a resource location of the power saving signal; sending the power saving signal at the resource location indicated by the configuration information.

Sending the configuration information of the power saving signal includes: sending a broadcast message, wherein the broadcast message includes the configuration information of the power saving signal.

Before sending the broadcast message, the method further includes: receiving a request message sent by a terminal, wherein the request message is used for requesting the network-side device to send the configuration information of the power saving signal.

The request message is a preamble and/or a data packet.

Sending the configuration information of the power saving signal includes: sending a dedicated signaling including the configuration information of the power saving signal.

Before sending the dedicated signaling including the configuration information of the power saving signal, the method further includes: sending a first capability request message to a terminal; receiving a power saving capability of the terminal reported by the terminal according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep; configuring the power saving signal for the terminal according to the power saving capability of the terminal.

Before sending the dedicated signaling including the configuration information of the power saving signal, the method further includes: sending second capability request information to a core network, wherein the second capability request information carries identification information of the terminal; receiving a power saving capability of the terminal sent by the core network according to the second capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep; configuring the power saving signal for the terminal according to the power saving capability of the terminal.

The configuration information of the power saving signal includes at least one of following: time-domain location information of transmission of the power saving signal; a time offset between a monitoring position of the power saving signal and a system frame number 0 and/or a slot start position; a duration of transmission of the power saving signal; a timing advance between a monitoring position of the power saving signal and a monitoring position of a downlink control channel; frequency-domain position information of transmission of the power saving signal; an effective time duration of the power saving signal; a duration of monitoring a downlink control channel.

The configuration information of the power saving signal further includes at least one of following: identification information of the power saving signal; a cell group identification list to which the configuration information is applicable; a distribute unit identification list to which the configuration information is applicable; a minimum threshold value of a signal quality of an effective power saving signal.

A terminal is provided. The terminal includes a transceiver, a storage, a processor, and a program stored on the storage and executable by the processor; wherein the transceiver is configured for receiving configuration information of a power saving signal, wherein the configuration information is at least used for indicating a resource location of the power saving signal; the processor is configured to read a program in the storage and perform a step of monitoring the power saving signal at the resource location indicated by the configuration information.

The processor is further configured for determining whether to monitor a downlink control channel according to whether the power saving signal is monitored.

The transceiver is further configured for receiving a broadcast message sent by the network-side device, wherein the broadcast message includes the configuration information of the power saving signal.

The transceiver is further configured for sending a request message to the network-side device, wherein the request message is used for requesting the network-side device to send the configuration information of the power saving signal.

The request message is a preamble and/or a data packet.

The transceiver is further configured for receiving a dedicated signaling sent by the network-side device, wherein the dedicated signaling includes the configuration information of the power saving signal.

The transceiver is further configured for: receiving a first capability request message sent by the network-side device; reporting a power saving capability of the terminal to the network-side device according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

The configuration information of the power saving signal includes at least one of following: time-domain location information of transmission of the power saving signal; a time offset between a monitoring position of the power saving signal and a system frame number 0 and/or a slot start position; a transmission duration of the power saving signal; a timing advance between a monitoring position of the power saving signal and a monitoring position of a downlink control channel; frequency-domain position information of transmission of the power saving signal; an effective time duration of the power saving signal; a time duration of monitoring the downlink control channel.

The configuration information of the power saving signal further includes at least one of following: identification information of the power saving signal; a cell group identification list to which the configuration information is applicable; a distribute unit identification list to which the configuration information is applicable; a minimum threshold value of a signal quality of an effective power saving signal.

A device of monitoring a power saving signal is provided. The device is applied in a terminal, the device includes: a receiving module, configured for receiving configuration information of a power saving signal, wherein the configuration information is at least used for indicating a resource location of the power saving signal; a monitoring module, configured for monitoring the power saving signal at the resource location indicated by the configuration information.

A computer readable storage medium on which a program is stored is provided, wherein when the program is executed by the processor, the processor implements the steps of the method of monitoring a power saving signal provided above.

A network-side device is provided. The network-side device includes a transceiver, a storage, a processor, and a program stored on the storage and executable by the processor; wherein the processor is configured to read a program in the storage and control the transceiver to perform following steps: sending configuration information of a power saving signal, wherein the configuration information is at least used for indicating a resource location of the power saving signal; sending the power saving signal at the resource location indicated by the configuration information.

The transceiver is further configured for sending a broadcast message, wherein the broadcast message includes the configuration information of the power saving signal.

The transceiver is further configured for receiving a request message sent by a terminal, wherein the request message is used for requesting the network-side device to send the configuration information of the power saving signal.

The request message is a preamble and/or a data packet.

The transceiver is further configured for sending a dedicated signaling including the configuration information of the power saving signal.

The transceiver is further configured for: sending a first capability request message to a terminal; receiving a power saving capability of the terminal reported by the terminal according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep; configuring the power saving signal for the terminal according to the power saving capability of the terminal.

The transceiver is further configured for: sending second capability request information to a core network, wherein the second capability request information carries identification information of the terminal; receiving a power saving capability of the terminal sent by the core network according to the second capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep; configuring the power saving signal for the terminal according to the power saving capability of the terminal.

The configuration information of the power saving signal includes at least one of following: time-domain location information of transmission of the power saving signal; a time offset between a monitoring position of the power saving signal and a system frame number 0 and/or a slot start position; a duration of transmission of the power saving signal; a timing advance between a monitoring position of the power saving signal and a monitoring position of a downlink control channel; frequency-domain position information of transmission of the power saving signal; an effective time duration of the power saving signal; a duration of monitoring a downlink control channel.

The configuration information of the power saving signal further includes at least one of following: identification information of the power saving signal; a cell group identification list to which the configuration information is applicable; a distribute unit identification list to which the configuration information is applicable; a minimum threshold value of a signal quality of an effective power saving signal.

A device of configuring a power saving signal is provided. The device is applied to a network-side device, the device includes: a first sending module, configured for sending configuration information of a power saving signal, wherein the configuration information is at least used for indicating a resource location of the power saving signal; a second sending module, configured for sending the power saving signal at the resource location indicated by the configuration information.

A computer-readable storage medium on which a program is stored is provided, wherein when the program is executed by a processor, the processor implements steps of the method of configuring a power saving signal provided above.

The above technical solutions of the present disclosure have at least the following beneficial effects.

In the method of monitoring a power saving signal and the method of configuring the power saving signal, the terminal and the network-side device in the embodiments of the present disclosure, the network-side device sends the configuration information of the power saving signal to the terminal to inform the terminal of resource positions at which the terminal should monitor the power saving signal, therefore, the monitoring efficiency of the power saving signal is improved and the resources are saved.

DETAILED DESCRIPTION

In order to make technical problems to be solved by the present disclosure, technical solutions and advantages more clear, description will be made in detail in the following in conjunction with drawings and specific embodiments.

Figure 1:
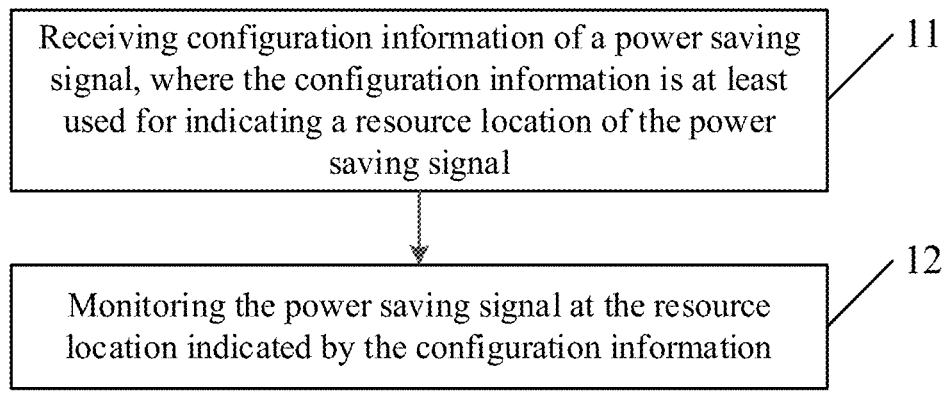
FIG. 1 is a flowchart showing steps of a method of monitoring a power saving signal according to an embodiment of the present disclosure.

As shown in FIG. 1, an embodiment of the present disclosure provides a method of monitoring a power saving signal, which is applied to a terminal and includes steps 11 and 12.

Step 11: receiving configuration information of a power saving signal, where the configuration information is at least used for indicating a resource location of the power saving signal.

Step 12: monitoring the power saving signal at the resource location indicated by the configuration information.

In the embodiment of the present disclosure, the power saving signal may specifically be a wake-up signal WUS, and if the power saving signal is received by the terminal, then the terminal wakes up on a corresponding resource to monitor a downlink control channel (e.g., PDCCH), otherwise, the terminal continues to sleep.

Further, in the embodiment of the present disclosure, after step 12, the method further includes: determining whether to monitor a downlink control channel according to whether the power saving signal is monitored.

To sum up, in the above embodiments of the present disclosure, the network-side device sends the configuration information of the power saving signal to the terminal, and the terminal performs an operation of monitoring the power saving signal according to this configuration information and a subsequent operation of monitoring the downlink control channel. In this way, the problem of how the terminal monitors the power saving signal in a NR system is addressed.

As one embodiment, the terminal obtains the configuration information of the power saving signal through a broadcast message, that is, the step 11 includes: receiving a broadcast message sent by the network-side device, wherein the broadcast message includes the configuration information of the power saving signal.

Optionally, the terminal may first receive SIB1 (system information block 1), and acquire scheduling information of other broadcast messages from the SIB1, and then receive a broadcast message containing the configuration information of the power saving signal according to the corresponding scheduling information.

Optionally, before receiving the broadcast message sent by the network-side device, the method further includes: sending a request message to the network-side device, wherein the request message is used for requesting the network-side device to send the configuration information of the power saving signal.

Figure 2:
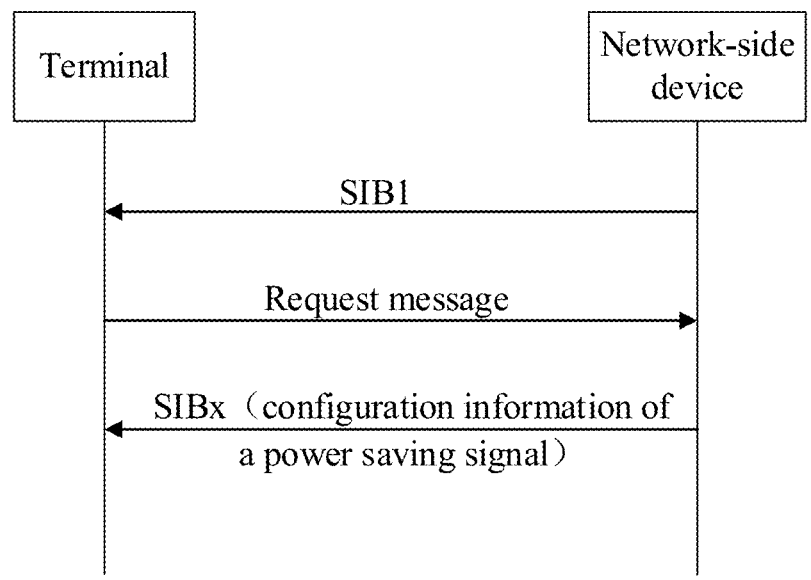
FIG. 2 is a schematic diagram illustrating a first way for obtaining configuration information of a power saving signal in a method of monitoring a power saving signal according to an embodiment of the present disclosure.

As shown in FIG. 2, the terminal sends a request message to the network-side device. After receiving the request message, the network-side device sends a broadcast message containing the configuration information of the power saving signal; if no corresponding request message is received by the network-side device, the broadcast message sent by the network-side device does not include the configuration information of the power saving signal. Compared with a case where the broadcast message containing the configuration information of the power saving signal is persistently sent, signaling overhead and resource occupation can be saved in the case where the broadcast message including the configuration information of the power saving signal is sent according to the request message.

Optionally, the terminal may receive the broadcast message in both an RRC (Radio Resource Control) Idle state and/or a RRC connected state.

Optionally, the request message may be a preamble and/or a data packet, which may correspond to the configuration information of the power saving signal. After receiving the preamble and/or the data packet corresponding to the configuration information of the power saving signal, the network-side device sends the configuration information.

As another embodiment, the terminal obtains the configuration information of the power saving signal through a dedicated signaling, that is, the step 11 includes: receiving a dedicated signaling sent by a network-side device, wherein the dedicated signaling includes the configuration information of the power saving signal.

Optionally, in this embodiment, before receiving the dedicated signaling sent by the network-side device, the method further includes: receiving a first capability request message sent by the network-side device; reporting a power saving capability of the terminal to the network-side device according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

Figure 3:
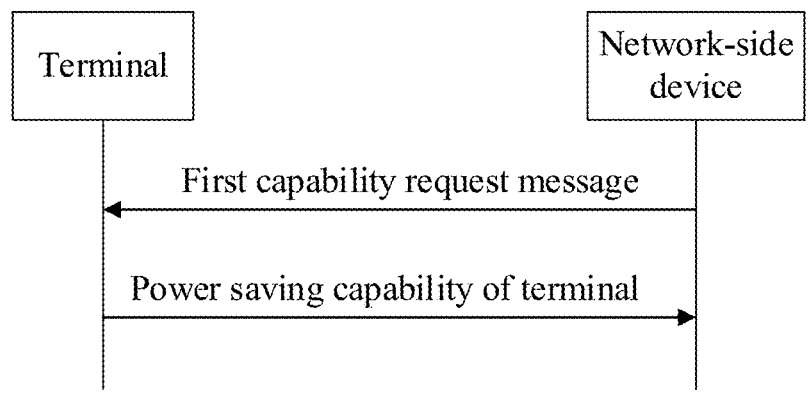
FIG. 3 is a schematic diagram of a second way for obtaining configuration information of a power saving signal in a method of monitoring a power saving signal according to an embodiment of the present disclosure.

As shown in FIG. 3, after the terminal enters the connected state, the network-side device sends the first capability request message to the terminal, which is used for requesting the terminal to report its capability related to the power saving signal. After receiving the first capability request message from the network-side device, the terminal reports the power saving capability of the terminal.

Optionally, in a specific embodiment of the present disclosure, the configuration information of the power saving signal includes at least one of the following: (1) time-domain location information of transmission of a power saving signal, such as a transmission period of a power saving signal, where the transmission period may be configured separately or may be consistent with a DRX cycle and/or a paging period; (2) a time offset between a monitoring position of the power saving signal and a system frame number 0 (SFN 0) and/or a slot start position; (3) a transmission duration of a power saving signal, where the transmission duration of a power saving signal may be N time slots, or N symbols, or N mini-slots, N is an integer greater than or equal to 1; (4) a timing advance between a monitoring position of the power saving signal and a monitoring position of a downlink control channel, where since it takes a certain time duration to decode the power saving signal, the timing advance is used to indicate a time interval gap between the monitoring position of the power saving signal and reception of the downlink control channel; (5) frequency-domain position information of transmission of the power saving signal, for example, a frequency-domain start position of transmission of the power saving signal and/or a bandwidth part (BWP) ID position, and/or serving-cell index ID information, and/or a start position of a resource block (Resource Block, RB), and the like; (6) an effective time duration of the power saving signal, wherein for example, in a certain time period, the power saving signal is received, and when the time period passed, the terminal can enter deep sleep, that is, the terminal does not need to maintain synchronization or the like with the network, the effective time duration may be an absolute time length, such as M time slots, M sub-frames, M milliseconds (ms), M seconds (s), etc., the effective time duration may optionally be K periods, where the period may be a transmission period of power saving signals, a DRX cycle, or a paging period of the power saving signal, where are not limited here; (7) a duration of monitoring the downlink control channel in case that the terminal monitors the downlink control channel according to the indication of the power saving signal, wherein the duration length may be L PDCCH opportunities, or may be a time length of a DRX on duration or a length of a DRX inactivity timer, which is not specifically limited here.

Further, the configuration information of the power saving signal further includes at least one of the following: (1) identification information of the power saving signal, wherein the identification information is used for indicating that the power saving signal is a power saving signal corresponding to the terminal; (2) a cell group (CG) identification list to which the configuration information is applicable; (3) a distribute unit (DU) identification list to which the configuration information is applicable; (4) a minimum threshold value of a signal quality of an effective power saving signal, wherein when a signal quality of the power saving signal detected by the terminal is lower than the minimum threshold value, the terminal considers that the power saving signal to be unavailable, and the terminal will perform a re-search procedure for the power saving signal.

It should be noted that the signal quality of the power saving signal can be expressed by the following parameters: (1) (RSRP): an abbreviation of a Reference Signal Received Power, a linear value (power on each RE) of a power of a cell downlink common pilot in a measured bandwidth, representing a signal power S, reflecting a path loss strength of a current channel, and being used for measurement for cell coverage and cell selection/selection and handover; (2) a received signal strength indicator (RSSI): an abbreviation of a Received Signal Strength Indicator; the terminal detects a total received power on all resource elements (RE) of an OFDM symbol within a bandwidth, including a serving cell signal and a non-serving cell signal, adjacent channel interference, internal thermal noise of a system, etc. that is, the total power is S+I+N, where I is an interference power, N is a noise power, and S is a signal power; the RSSI may reflect a received signal strength and an interference strength at a current channel; (3) a reference signal received quality (RSRQ): an abbreviation of a reference signal received quality, which is defined as A*RSRP/RSSI, where A represents the number of resource blocks in the measurement bandwidth measuring the RSSI, that is, the total number of resource blocks in a system bandwidth, the RSRQ may reflect and indicate a signal-to-noise ratio of a current channel quality and an interference level; (4) Signal to interference plus noise ratio (SINR): a ratio of a reference signal power to an interference noise power within a sounding bandwidth of the terminal, i.e. S/(I+N), where the signal power is a received power of a CRS, I+N is a sum of non-serving cell interference, adjacent channel interference and system internal thermal noise on the reference signal; the SINR reflects a link quality of a current channel and is an important index to quantify performance parameters of the terminal.

Figure 4:
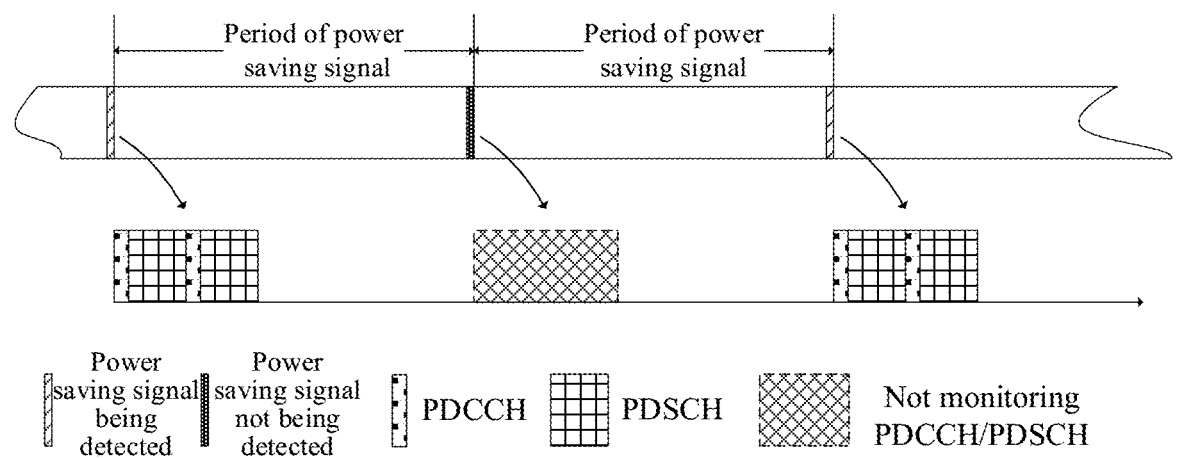
FIG. 4 is a first schematic diagram of a principle of a method of monitoring a power saving signal according to an embodiment of the present disclosure.
Figure 5:
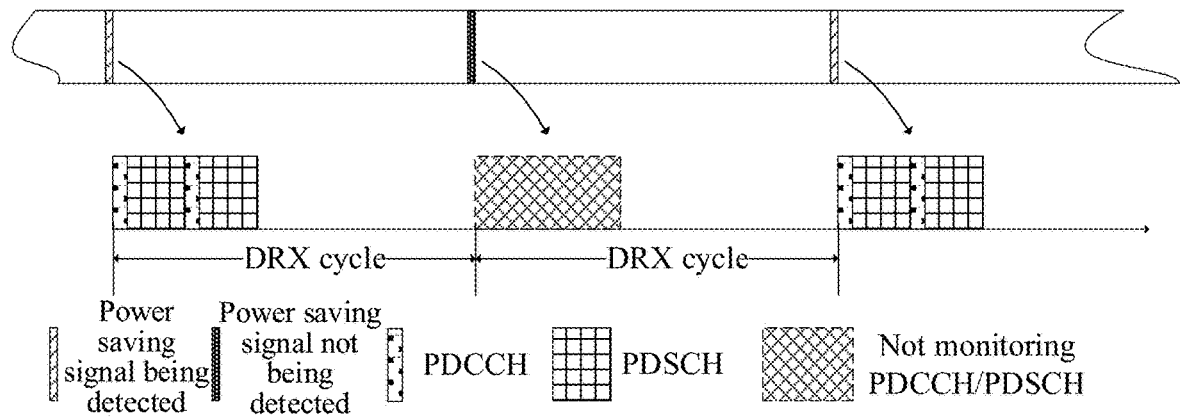
FIG. 5 is a second schematic diagram of a principle of a method of monitoring a power saving signal according to an embodiment of the present disclosure.

As an embodiment, if the configuration information of the power saving signal includes a time-domain location of transmitting the power saving signal, then the terminal will perform the operation of monitoring the power saving signal according to the time-domain location. As an example, as shown in FIG. 4, the power saving signal is periodically transmitted, and the terminal monitors the power saving signal in a corresponding period. As another example, as shown in FIG. 5, a period of the power saving signal is the same as a DRX cycle, and then the terminal will wake up before the DRX cycle, to monitor the power saving signal.

Figure 6:
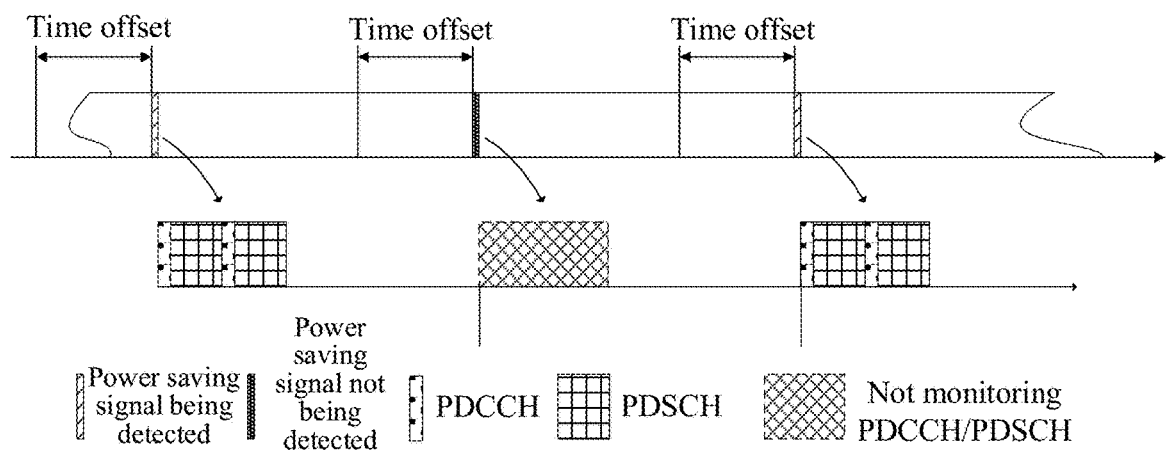
FIG. 6 is a third schematic diagram of a principle of a method of monitoring a power saving signal according to an embodiment of the present disclosure.

As another example, if the configuration information of the power saving signal includes a time offset, then a time offset for indicating a monitoring position of the power saving signal and a system frame number 0 (SFN 0) and/or a slot start position; the time offset defines a start position of a monitoring power saving signal, the time offset can also be obtained by sending a sequence, and the terminal looks up a table according to the sequence. As shown in FIG. 6, the terminal monitors the power saving signal at a position after the beginning of a slot and/or a frame plus the time offset.

Optionally, the time offset may also be calculated according to ID information of the terminal, such as performing a modulo operation according to C-RNTI of a UE, or performing a modulo operation according to a power saving signal ID of the terminal, which is not limited here.

Figure 7:
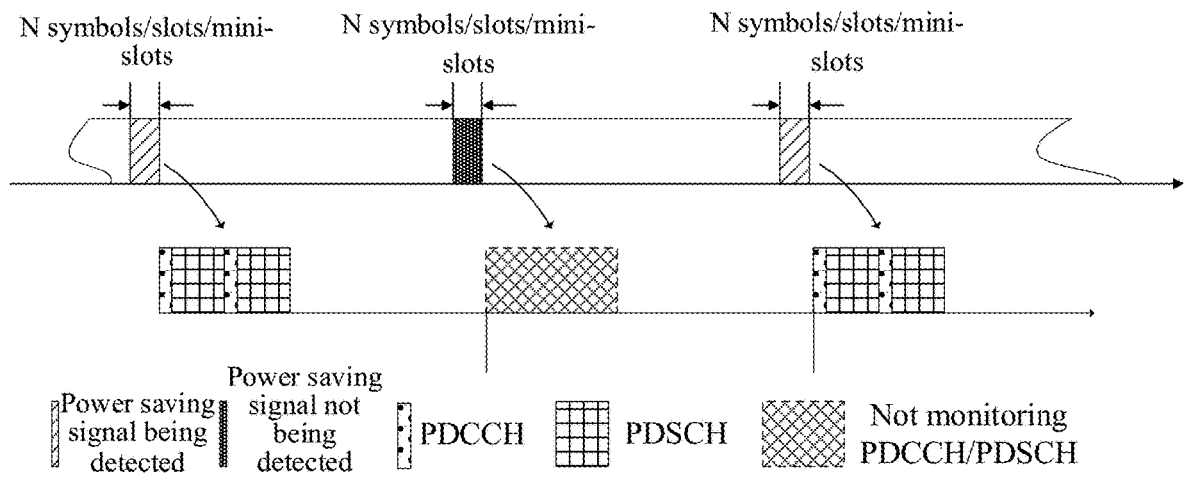
FIG. 7 is a fourth schematic diagram of a principle of a method of monitoring a power saving signal according to an embodiment of the present disclosure.

As another embodiment, if the configuration information of the power saving signal includes a transmission length of the power saving signal, the transmission length may be N time slots, or N symbols, or N mini-slots, where N is an integer greater than or equal to 1. As shown in FIG. 7, the terminal continuously monitors the power saving signal within the transmission length.

Figure 8:
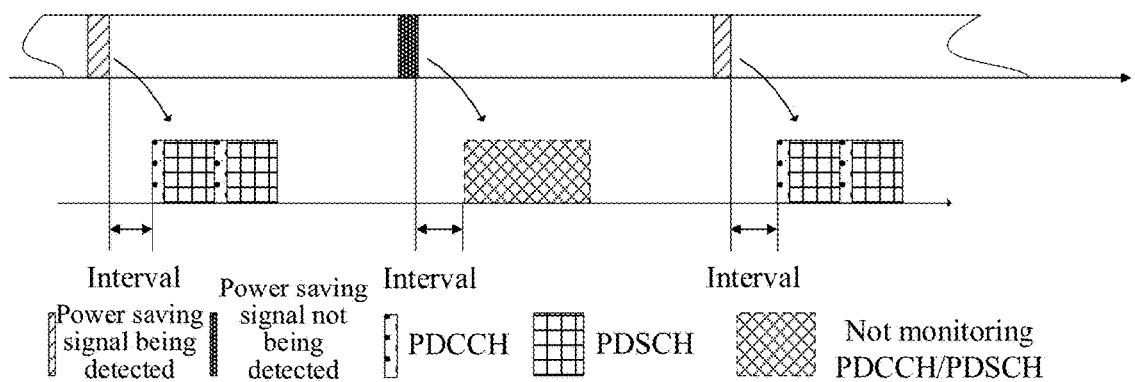
FIG. 8 is a fifth schematic diagram of a principle of a method of monitoring a power saving signal according to an embodiment of the present disclosure.

As another embodiment, if the configuration information of the power saving signal includes a timing advance between the monitoring position of the power saving signal and the monitoring position of the downlink control channel, then since it takes a certain time duration to decode the power saving signal, the timing advance is used to indicate a time gap between the monitoring position of the power saving signal and the reception of the downlink control channel, as shown in FIG. 8.

As another embodiment, if the configuration information of the power saving signal includes identification information of a power saving signal, then the identification information is used to indicate that the power saving signal is a power saving signal corresponding to the terminal, the identification information may indicate identification information of one or more power saving signals, the identification information may correspond to a terminal or may match a plurality of terminals, which are not limited here.

As another embodiment, if the configuration information of the power saving signal includes the frequency-domain location information of transmission of the power saving signal, then the terminal monitors the power saving signal according to the indicated frequency-domain location.

Figure 9:
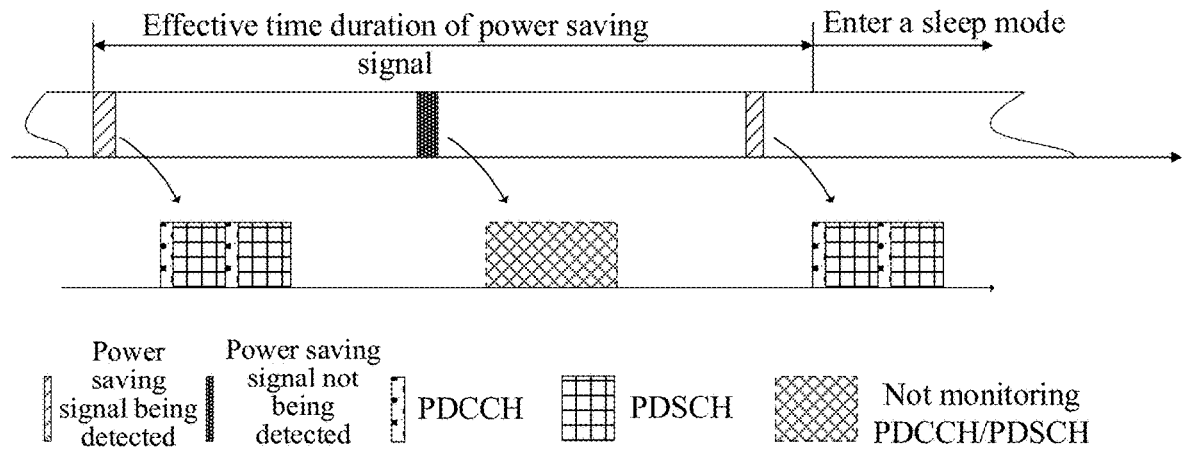
FIG. 9 is a sixth schematic diagram of a principle of a method of monitoring a power saving signal according to an embodiment of the present disclosure.

As another embodiment, if the configuration information of the power saving signal includes the effective time duration of the power saving signal, then for example, as shown in FIG. 9, in a certain time period, the power saving signal is received; when the time period passes, the terminal can enter deep sleep, i.e. the terminal does not need to maintain synchronization or the like with the network; the effective time duration can be an absolute time duration, such as M time slots, M sub-frames, M milliseconds (ms), M seconds (s), etc., the effective time duration may also be k periods, wherein the period may be a transmission period of a power saving signal, a DRX cycle, or a paging cycle, which are not limited herein.

Figure 10:
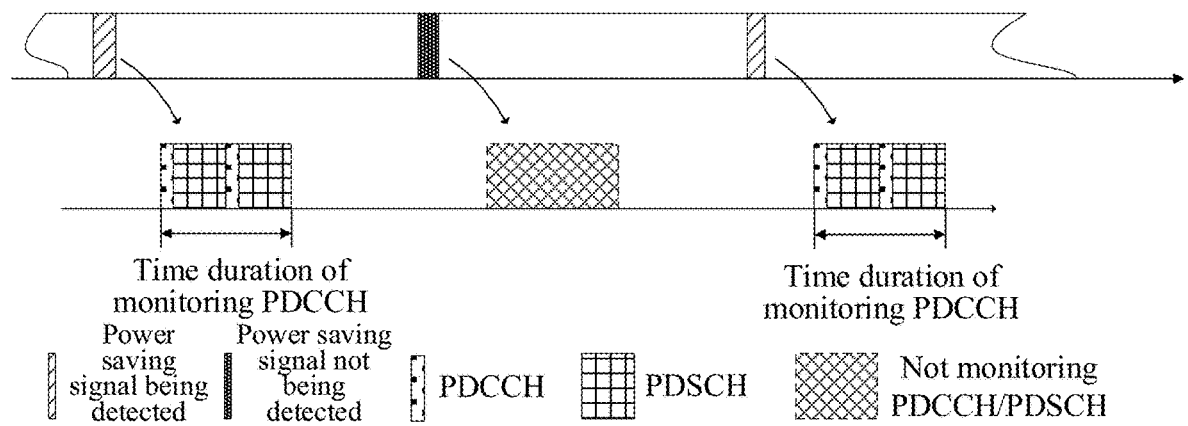
FIG. 10 is a seventh schematic diagram of a principle of a method of monitoring a power saving signal according to an embodiment of the present disclosure.

As another duration, if the configuration information of the power saving signal includes a duration of monitoring the PDCCH after the power saving signal is detected by the terminal. As shown in FIG. 10, the duration may be L PDCCH opportunities, a time duration of DRX on duration, or a duration of a DRX inactivity timer, which are not particularly limited here.

To sum up, in the above embodiments of the present disclosure, the network-side device sends the configuration information of the power saving signal to the terminal to notify the terminal of resource locations at which the terminal should monitor the power saving signal, so as to improve a monitoring efficiency for the power saving signal and save resources.

Figure 11:
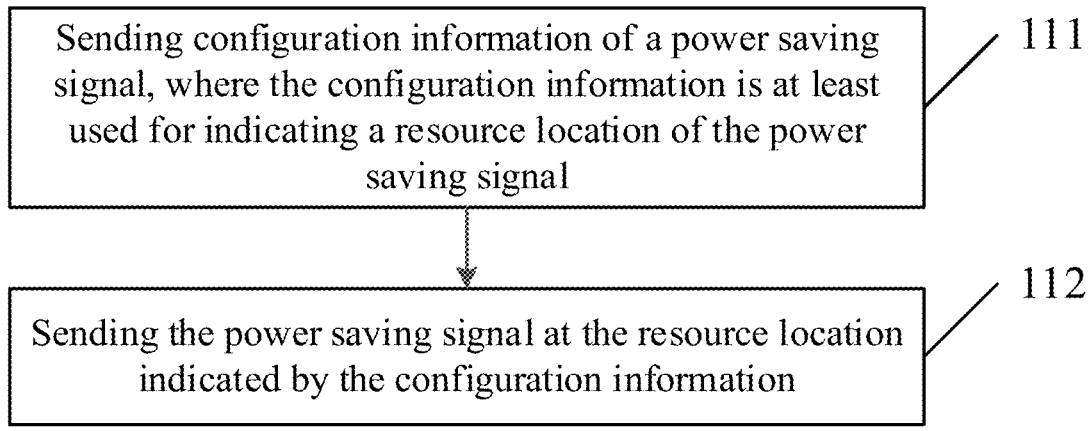
FIG. 11 is a flowchart of steps of a method of configuring a power saving signal according to an embodiment of the present disclosure.

As shown in FIG. 11, an embodiment of the present disclosure further provides a method of configuring a power saving signal, which is applied to a network-side device, and the method includes steps 111-112.

Step 111: sending configuration information of a power saving signal, where the configuration information is at least used for indicating a resource location of the power saving signal.

Step 112: sending the power saving signal at the resource location indicated by the configuration information.

In the embodiment of the present disclosure, the power saving signal may specifically be a wake-up signal WUS, and the terminal wakes up, if the power saving signal is received, to monitor a downlink control channel (e.g., PDCCH) on the corresponding resource, otherwise, the terminal continues to sleep.

As one embodiment, the terminal obtains the configuration information of the power saving signal through a broadcast message, that is, the step 111 includes: sending a broadcast message, wherein the broadcast message includes the configuration information of the power saving signal.

Optionally, before sending the broadcast message, the method further includes: receiving a request message sent by a terminal, wherein the request message is used for requesting the network-side device to send the configuration information of the power saving signal.

As shown in FIG. 2, the terminal sends a request message to the network-side device. After receiving the request message, the network-side device sends a broadcast message containing the configuration information of the power saving signal; if no corresponding request message is received by the network-side device, the broadcast message sent by the network-side device does not include the configuration information of the power saving signal. Compared with a case where the broadcast message containing the configuration information of the power saving signal is persistently sent, signaling overhead and resource occupation can be saved in the case where the broadcast message including the configuration information of the power saving signal is sent according to the request message.

Optionally, the request message is a preamble and/or a data packet.

As another embodiment, the terminal obtains the configuration information of the power saving signal through a dedicated signaling, that is, step 111 includes: sending a dedicated signaling including configuration information of the power saving signal.

Optionally, in this embodiment, before sending the dedicated signaling including the configuration information of the power saving signal, the method further includes: sending a first capability request message to the terminal; receiving a power saving capability of the terminal reported by the terminal according to the first capability request message; and configuring the power saving signal for the terminal according to the power saving capability of the terminal, wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

As shown in FIG. 3, after the terminal enters the connected state, the network-side device sends the first capability request message to the terminal, which is used for requesting the terminal to report its capability related to the power saving signal. After receiving the first capability request message from the network-side device, the terminal reports the power saving capability of the terminal.

Optionally, in this embodiment, before sending the dedicated signaling including the configuration information of the power saving signal, the method further includes: sending second capability request information to a core network, wherein the second capability request information carries identification information of the terminal; receiving the power saving capability of the terminal sent by the core network according to the second capability request message; configuring the power saving signal for the terminal according to the power saving capability of the terminal, wherein the power saving capability of the terminal includes at least one of the following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

That is, after the terminal enters the RRC connected state, the network-side device obtains ID information of the terminal, and sends a second capability request message to the core network, where the message is used to request the core network to report power saving signal-related capability of the terminal. After receiving the second capability request message, the core network feeds back the power saving capability of the terminal.

Optionally, in a specific embodiment of the present disclosure, the configuration information of the power saving signal includes at least one of the following: (1) time-domain location information of transmission of a power saving signal, such as a transmission period of a power saving signal, where the transmission period may be configured separately or may be consistent with a DRX cycle and/or a paging period; (2) a transmission duration of a power saving signal, where the transmission duration of a power saving signal may be N time slots, or N symbols, or N mini-slots, N is an integer greater than or equal to 1; (3) a timing advance between a monitoring position of the power saving signal and a monitoring position of a downlink control channel, where since it takes a certain time duration to decode the power saving signal, the timing advance is used to indicate a time gap between the monitoring position of the power saving signal and reception of the downlink control channel; (4) frequency-domain position information of transmission of the power saving signal, for example, a frequency-domain start position of transmission of the power saving signal and/or a bandwidth part (BWP) ID position, and/or serving-cell index ID information, and the like; (5) an effective time duration of the power saving signal, wherein for example, in a certain time period, the power saving signal is received, and when the time period passed, the terminal can enter deep sleep, that is, the terminal does not need to maintain synchronization or the like with the network, the effective time duration may be an absolute time length, such as M time slots, M sub-frames, M milliseconds (ms), M seconds (s), etc., the effective time duration may optionally be K periods, where the period may be a transmission period of power saving signals, a DRX cycle, or a paging period of the power saving signal, where are not limited here; (6) a duration of monitoring the downlink control channel in case that the terminal monitors the downlink control channel according to the indication of the power saving signal, wherein the duration length may be L PDCCH opportunities, or may be a time duration of a DRX on duration or a duration of a DRX inactivity timer, which is not specifically limited here.

Further, the configuration information of the power saving signal further includes at least one of the following: (1) identification information of the power saving signal, wherein the identification information is used for indicating that the power saving signal is a power saving signal corresponding to the terminal; (2) a cell group (CG) identification list to which the configuration information is applicable; (3) a distribute unit (DU) identification list to which the configuration information is applicable; (4) a minimum threshold value of a signal quality of an effective power saving signal, wherein when a signal quality of the power saving signal detected by the terminal is lower than the minimum threshold value, the terminal considers that the power saving signal to be unavailable, and the terminal will perform a re-search procedure for the power saving signal.

It should be noted that the signal quality of the power saving signal can be expressed by the following parameters: (1) RSRP: an abbreviation of a Reference Signal Received Power, a linear value (power on each RE) of a power of a cell downlink common pilot in a measured bandwidth, representing a signal power S, reflecting a path loss strength of a current channel, and being used for measurement for cell coverage and cell selection/selection and handover; (2) a received signal strength indicator (RSSI): an abbreviation of a Received Signal Strength Indicator; the terminal detects a total received power on all resource elements (RE) of an OFDM symbol within a bandwidth, including a serving cell signal and a non-serving cell signal, adjacent channel interference, internal thermal noise of a system, etc. that is, the total power is S+I+N, where I is an interference power, N is a noise power, and S is a signal power; the RSSI may reflect a received signal strength and an interference strength at a current channel; (3) a reference signal received quality (RSRQ): an abbreviation of a reference signal received quality, which is defined as M*RSRP/RSSI, where M represents the number of resource blocks in the measurement bandwidth measuring the RSSI, that is, the total number of resource blocks in a system bandwidth, the RSRQ may reflect and indicate a signal-to-noise ratio of a current channel quality and an interference level; (4) Signal to interference plus noise ratio (SINR): a ratio of a reference signal power to an interference noise power within a sounding bandwidth of the terminal, i.e. S/(I+N), where the signal power is a received power of a CRS, I+N is a sum of non-serving cell interference, adjacent channel interference and system internal thermal noise on the reference signal; the SINR reflects a link quality of a current channel and is an important index to quantify performance parameters of the terminal.

To sum up, in the above embodiments of the present disclosure, the network-side device sends the configuration information of the power saving signal to the terminal, to notify the terminal that which resource location is used to monitor the power saving signal, so as to improve the monitoring efficiency for the power saving signal and save resources.

Figure 12:
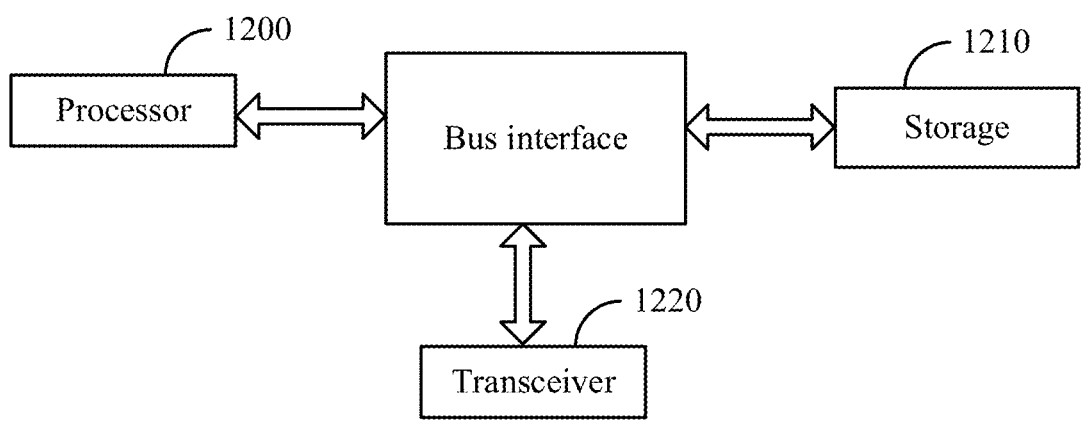
FIG. 12 is a schematic structural diagram of a terminal and a network-side device according to an embodiment of the present disclosure.

As shown in FIG. 12, an embodiment of the present disclosure also provides a terminal, the terminal includes a transceiver 1220, a storage 1210, a processor 1200, and a computer program stored on the storage 1210 and executable on the processor 1200. The transceiver 1220 is configured for receiving configuration information of a power saving signal, the configuration information is at least used for indicating a resource location of the power saving signal.

The processor 1200 is configured for reading a program in the storage and performing a step of monitoring the power saving signal at a resource location indicated by the configuration information.

Optionally, in the above embodiments of the present disclosure, the processor 1200 is further configured for determining whether to monitor a downlink control channel according to whether the power saving signal is monitored.

Optionally, in the above embodiments of the present disclosure, the transceiver 1220 is further configured for receiving a broadcast message sent by the network-side device, wherein the broadcast message includes the configuration information of the power saving signal.

Optionally, in the above embodiments of the present disclosure, the transceiver 1220 is further configured for sending a request message to the network-side device, wherein the request message is used for requesting the network-side device to send the configuration information of the power saving signal.

Optionally, in the above embodiments of the present disclosure, the request message is a preamble and/or a data packet.

Optionally, in the above embodiments of the present disclosure, the transceiver 1220 is further configured for receiving a dedicated signaling sent by a network-side device, wherein the dedicated signaling includes the configuration information of the power saving signal.

Optionally, in the above embodiments of the present disclosure, the transceiver 1220 is further configured for receiving a first capability request message sent by the network-side device; reporting a power saving capability of the terminal to the network-side device according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

Optionally, in the above embodiments of the present disclosure, the configuration information of the power saving signal includes at least one of the following: (1) time-domain location information of transmission of a power saving signal; (2) a time offset between a monitoring position of the power saving signal and a system frame number 0 (SFN 0) and/or a slot start position; (3) a transmission duration of a power saving signal; (4) a timing advance between a monitoring position of the power saving signal and a monitoring position of a downlink control channel; (5) frequency-domain position information of transmission of the power saving signal; (6) an effective time duration of the power saving signal; (7) a duration of monitoring the downlink control channel in case that the terminal monitors the downlink control channel according to the indication of the power saving signal.

Optionally, in the above embodiments of the present disclosure, the configuration information of the power saving signal further includes at least one of the following: (1) identification information of the power saving signal; (2) a cell group (CG) identification list to which the configuration information is applicable; (3) a distribute unit (DU) identification list to which the configuration information is applicable; (4) a minimum threshold value of a signal quality of an effective power saving signal.

To sum up, in the above embodiments of the present disclosure, the network-side device sends the configuration information of the power saving signal to the terminal, to notify the terminal of resource locations at which the terminal should monitor the power saving signal, so as to improve the monitoring efficiency for the power saving signal and save resources.

It should be noted that, the terminal provided by the above embodiments of the present disclosure is a terminal capable of executing the above method of monitoring the power saving signal, and then all embodiments of the method of monitoring a power saving signal are applicable to the terminal, and can all achieve the same or similar beneficial effects.

Figure 13:
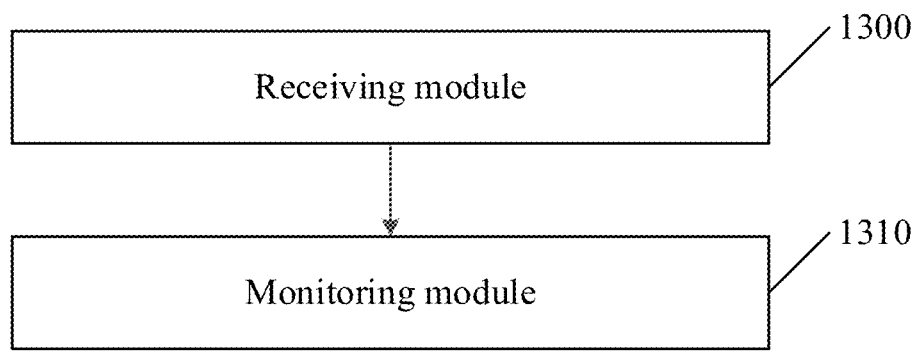
FIG. 13 is a schematic structural diagram of a device of monitoring a power saving signal according to an embodiment of the present disclosure.

As shown in FIG. 13, an embodiment of the present disclosure further provides a device of monitoring a power saving signal, which is applied to a terminal and includes a receiving module 1300 and a monitoring module 1310.

The receiving module 1300 is configured for receiving configuration information of a power saving signal, where the configuration information is at least used for indicating a resource location of the power saving signal.

The monitoring module 1310 is configured for monitoring the power saving signal at the resource location indicated by the configuration information.

Optionally, in the above embodiment of the present disclosure, the device further includes a determining module configured for determining whether to monitor a downlink control channel according to whether the power saving signal is monitored.

Optionally, in the above embodiment of the present disclosure, the receiving module 1300 includes a first receiving sub-module configured for receiving a broadcast message sent by the network-side device, wherein the broadcast message includes the configuration information of the power saving signal.

Optionally, in the above embodiment of the present disclosure, the device further includes a first request module configured for sending a request message to the network-side device, wherein the request message is used for requesting the network-side device to send the configuration information of the power saving signal.

Optionally, in the above embodiments of the present disclosure, the request message is a preamble and/or a data packet.

Optionally, in the above embodiment of the present disclosure, the receiving module includes a second receiving sub-module configured for receiving a dedicated signaling sent by a network-side device, wherein the dedicated signaling includes the configuration information of the power saving signal.

Optionally, in the above embodiment of the present disclosure, the device further includes a first request receiving module configured for receiving a first capability request message sent by the network-side device, and a capability report module configured for reporting a power saving capability of the terminal to the network-side device according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

Optionally, in the above embodiments of the present disclosure, the configuration information of the power saving signal includes at least one of the following: (1) time-domain location information of transmission of a power saving signal; (2) a time offset between a monitoring position of the power saving signal and a system frame number 0 (SFN 0) and/or a slot start position; (3) a transmission duration of a power saving signal; (4) a timing advance between a monitoring position of the power saving signal and a monitoring position of a downlink control channel; (5) frequency-domain position information of transmission of the power saving signal; (6) an effective time duration of the power saving signal; (7) a duration of monitoring the downlink control channel in case that the terminal monitors the downlink control channel according to the indication of the power saving signal.

Optionally, in the above embodiments of the present disclosure, the configuration information of the power saving signal further includes at least one of the following: (1) identification information of the power saving signal; (2) a cell group (CG) identification list to which the configuration information is applicable; (3) a distribute unit (DU) identification list to which the configuration information is applicable; (4) a minimum threshold value of a signal quality of an effective power saving signal.

To sum up, in the above embodiments of the present disclosure, the network-side device sends the configuration information of the power saving signal to the terminal to notify the terminal of resource locations at which the terminal should monitor the power saving signal, so as to improve the monitoring efficiency for the power saving signal and save resources.

It should be noted that the device of monitoring a power saving signal provided by the above embodiments of the present disclosure is a device of monitoring a power saving signal capable of executing the above method of monitoring the power saving signal, all the embodiments of the method of monitoring the power saving signal are applicable to the device of monitoring the power saving signal, and the same or similar beneficial effects can be achieved.

The embodiments of the present disclosure also provide a computer readable storage medium on which a computer program is stored. When the computer program is executed by a processor, each step of the embodiments of the method of monitoring a power saving signal is implemented as described above, and the same technical effect can be achieved, and detailed description thereof is omitted here to avoid repetition. The computer-readable storage medium may be a Read-Only Memory (ROM), a Random Access Memory (RAM), or a magnetic disk or an optical disk.

As shown in FIG. 12, an embodiment of the present disclosure also provides a network-side device. The network-side device includes a transceiver 1220, a storage 1210, a processor 1200, and a computer program stored on the storage 1210 and executable on the processor 1200; the processor 1200 is configured to read a program in the storage and control the transceiver 1220 to perform following steps: sending configuration information of a power saving signal, where the configuration information is at least used for indicating a resource location of the power saving signal; and sending the power saving signal at the resource location indicated by the configuration information.

Optionally, in the above embodiments of the present disclosure, the transceiver 1220 is further configured for sending a broadcast message, wherein the broadcast message includes the configuration information of the power saving signal.

Optionally, in the above embodiments of the present disclosure, the transceiver 1220 is further configured for receiving a request message sent by a terminal, wherein the request message is used for requesting the network-side device to send the configuration information of the power saving signal.

Optionally, in the above embodiments of the present disclosure, the request message is a preamble and/or a data packet.

Optionally, in the above embodiments of the present disclosure, the transceiver 1220 is further configured for sending a dedicated signaling including the configuration information of the power saving signal.

Optionally, in the above embodiments of the present disclosure, the transceiver 1220 is further configured for sending a first capability request message to the terminal; receiving a power saving capability of the terminal reported by the terminal according to the first capability request message; and configuring the power saving signal for the terminal according to the power saving capability of the terminal, wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

Optionally, in the above embodiments of the present disclosure, the transceiver 1220 is further configured for sending second capability request information to a core network, wherein the second capability request information carries identification information of the terminal; receiving the power saving capability of the terminal sent by the core network according to the second capability request message; configuring the power saving signal for the terminal according to the power saving capability of the terminal, wherein the power saving capability of the terminal includes at least one of the following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep.

Optionally, in the above embodiments of the present disclosure, the configuration information of the power saving signal includes at least one of the following: (1) time-domain location information of transmission of a power saving signal; (2) a time offset of a monitoring position of the power saving signal and a system frame number 0 and/or a slot start position; (3) a duration of transmission of the power saving signal; (4) a timing advance between a monitoring position of the power saving signal and a monitoring position of a downlink control channel; (5) frequency-domain position information of transmission of the power saving signal; (6) an effective time duration of the power saving signal; (7) a duration of monitoring the downlink control channel in case that the terminal monitors the downlink control channel according to the indication of the power saving signal.

Optionally, in the above embodiments of the present disclosure, the configuration information of the power saving signal further includes at least one of the following: (1) identification information of the power saving signal; (2) a cell group identification list to which the configuration information is applicable; (3) a distribute unit identification list to which the configuration information is applicable; (4) a minimum threshold value of a signal quality of an effective power saving signal.

To sum up, in the above embodiments of the present disclosure, the network-side device sends the configuration information of the power saving signal to the terminal to notify the terminal of resource locations at which the terminal should monitor the power saving signal, so as to improve the monitoring efficiency of the power saving signal and save resources.

It should be noted that the network-side device provided by the above embodiments of the present disclosure is a network-side device capable of executing the above method of configuring the power saving signal, all the embodiments of the method of configuring the power saving signal are applicable to the network-side device, and the same or similar beneficial effects can be achieved.

Figure 14:
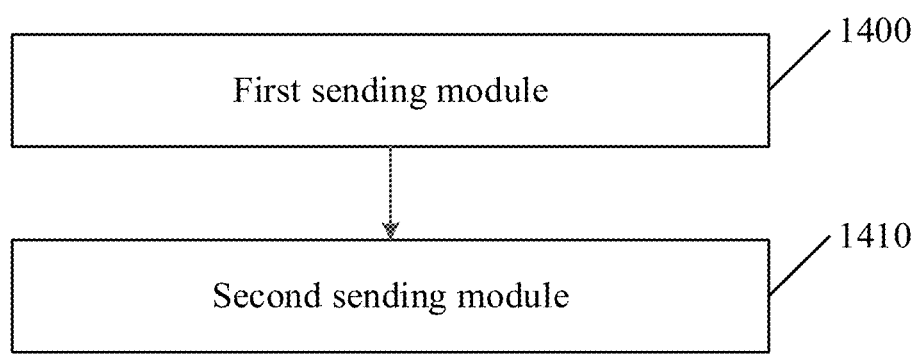
FIG. 14 is a schematic structural diagram of a device of configuring a power saving signal according to an embodiment of the present disclosure.

As shown in FIG. 14, an embodiment of the present disclosure further provides a device of configuring a power saving signal, which is applied to a network-side device, and includes a first sending module 1400 and a second sending module 1410.

The first sending module 1400 is configured for sending configuration information of a power saving signal, where the configuration information is at least used for indicating a resource location of the power saving signal.

The second sending module 1410 is configured for sending the power saving signal at the resource location indicated by the configuration information.

Optionally, in the above embodiments of the present disclosure, the first sending module includes a first sending sub-module configured for sending a broadcast message, wherein the broadcast message includes the configuration information of the power saving signal.

Optionally, in the above embodiment of the present disclosure, the device further includes a second request receiving module configured for receiving a request message sent by a terminal, wherein the request message is used for receiving a request message sent by a terminal, wherein the request message is used for requesting the network-side device to send the configuration information of the power saving signal.

Optionally, in the above embodiments of the present disclosure, the request message is a preamble and/or a data packet.

Optionally, in the above embodiments of the present disclosure, the first sending module includes a second sending sub-module configured for sending a dedicated signaling including the configuration information of the power saving signal.

Optionally, in the above embodiment of the present disclosure, the device further includes: a second requesting module configured for sending a first capability request message to the terminal; a first reporting module configured for receiving a power saving capability of the terminal reported by the terminal according to the first capability request message; wherein the power saving capability of the terminal includes at least one of following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep; and configuring the power saving signal for the terminal according to the power saving capability of the terminal.

Optionally, in the above embodiment of the present disclosure, the device further include: a third requesting module configured for sending second capability request information to a core network, wherein the second capability request information carries identification information of the terminal; a second reporting module configured for receiving the power saving capability of the terminal sent by the core network according to the second capability request message; wherein the power saving capability of the terminal includes at least one of the following: whether the terminal supports reception of a power saving signal; whether the terminal supports a power saving operation; whether the terminal supports periodic reception of a power saving signal; whether the terminal supports continuous monitoring of a power saving signal; whether the terminal supports deep sleep; configuring the power saving signal for the terminal according to the power saving capability of the terminal.

Optionally, in the above embodiments of the present disclosure, the configuration information of the power saving signal includes at least one of the following: (1) time-domain location information of transmission of a power saving signal; (2) a time offset of a monitoring position of the power saving signal and a system frame number 0 and/or a slot start position; (3) a duration of transmission of the power saving signal; (4) a timing advance between a monitoring position of the power saving signal and a monitoring position of a downlink control channel; (5) frequency-domain position information of transmission of the power saving signal; (6) an effective time duration of the power saving signal; (7) a duration of monitoring the downlink control channel in case that the terminal monitors the downlink control channel according to the indication of the power saving signal.

Optionally, in the above embodiments of the present disclosure, the configuration information of the power saving signal further includes at least one of the following: (1) identification information of the power saving signal; (2) a cell group identification list to which the configuration information is applicable; (3) a distribute unit identification list to which the configuration information is applicable; (4) a minimum threshold value of a signal quality of an effective power saving signal.

To sum up, in the above embodiments of the present disclosure, the network-side device sends the configuration information of the power saving signal to the terminal to notify the terminal of resource locations at which the terminal should monitor the power saving signal, so as to improve the monitoring efficiency of the power saving signal and save resources.

It should be noted that the device of configuring a power saving signal provided by the above embodiment of the present disclosure is a device of configuring a power saving signal capable of executing the above method of configuring the power saving signal, all the embodiments of the method of configuring the power saving signal are applicable to the device of configuring the power saving signal, and the same or similar beneficial effects can be achieved.

The embodiments of the present disclosure also provide a computer readable storage medium on which a computer program is stored. When the computer program is executed by a processor, each step of the embodiments of the method of configuring a power saving signal is implemented as described above, and the same technical effect can be achieved, and detailed description thereof is omitted here to avoid repetition. The computer-readable storage medium may be a Read-Only Memory (ROM), a Random Access Memory (RAM), or a magnetic disk or an optical disk.

It should be noted that terms such as "include", "comprise" or any other variation thereof are intended to cover non-exclusive inclusions, such that a process, a method, an article or a device including a series of elements includes not only those elements, but also other elements that are not explicitly listed, or may also include elements inherent to such process, method, article, or device. An element after a phrase "including a" does not exclude existence of another identical element in the process, the method, the article or the device including the element, if no further limitation is provided.

From the above description of the embodiments, it will be apparent to those skilled in the art that the methods of the above embodiments can be implemented by means of software plus a necessary general hardware platform, or by means of hardware only, but in many cases the former is the preferred embodiment. Based on such understanding, an essential part or a part contributing to the prior art in technical solutions of the present disclosure may be embodied in the form of a software product. The computer software product is stored in a storage medium (e.g., ROM/RAM, magnetic diskette, optical disc) and includes instructions for causing a terminal (which may be a mobile phone, a computer, a server, an air conditioner, or a network device, etc.) to perform the methods described in various embodiments of the present disclosure.

The embodiments of the present disclosure have been described above with reference to the accompanying drawings, but the present disclosure is not limited to the specific embodiments described above, which are intended to be illustrative only and not restrictive. Those of ordinary skill in the art, within the teachings of the present disclosure and without departing from the spirit of the present disclosure and the scope of the claims, may also take many form variations, all of which are within the protection scope of the present disclosure.

The foregoing provides optional embodiments of the present disclosure and it should be noted that several modifications and embellishments may be made by those of ordinary skill in the art without departing from the principles of the present disclosure. These modifications and embellishments are also considered to be within the protection scope of the present disclosure.

What is claimed is:

1. A method of monitoring a power saving signal, the method being performed by a terminal, the method comprising:
   receiving configuration information of a power saving signal, wherein the configuration information is at least used for indicating a resource location of the power saving signal;
   monitoring the power saving signal at the resource location indicated by the configuration information,
   wherein the configuration information of the power saving signal comprises at least one of following:
   time-domain location information of transmission of a power saving signal;
   a time offset between a monitoring position of the power saving signal and a system frame number 0 and/or a slot start position;
   a transmission duration of a power saving signal;
   a timing advance between a monitoring position of the power saving signal and a monitoring position of a downlink control channel;
   frequency-domain position information of transmission of the power saving signal;
   an effective time duration of the power saving signal;
   a duration of monitoring the downlink control channel,
   wherein the method further comprises determining whether to monitor a downlink control channel according to whether the power saving signal is monitored.

2. The method according to claim 1, wherein receiving the configuration information of the power saving signal comprises:
   receiving a broadcast message sent by the network-side device, wherein the broadcast message comprises the configuration information of the power saving signal; or,
   receiving a dedicated signaling sent by the network-side device, wherein the dedicated signaling comprises the configuration information of the power saving signal.

3. The method according to claim 2, wherein before receiving the broadcast message sent by the network-side device, the method further comprises:
   sending a request message to the network-side device, wherein the request message is used for requesting the network-side device to send the configuration information of the power saving signal.

4. The method according to claim 2, wherein before receiving the dedicated signaling sent by the network-side device, the method further comprises:
   receiving a first capability request message sent by the network-side device;
   reporting a power saving capability of the terminal to the network-side device according to the first capability request message;
   wherein the power saving capability of the terminal comprises at least one of following:
   whether the terminal supports reception of a power saving signal;
   whether the terminal supports a power saving operation;
   whether the terminal supports periodic reception of a power saving signal;
   whether the terminal supports continuous monitoring of a power saving signal;
   whether the terminal supports deep sleep.

5. The method according to claim 1, wherein the configuration information of the power saving signal further comprises at least one of following:
   identification information of the power saving signal;
   a cell group identification list to which the configuration information is applicable;
   a distribute unit identification list to which the configuration information is applicable;
   a minimum threshold value of a signal quality of an effective power saving signal.

6. A method of configuring a power saving signal, the method being performed by a network-side device, the method comprising:
   sending configuration information of a power saving signal, wherein the configuration information is at least used for indicating a resource location of the power saving signal;
   sending the power saving signal at the resource location indicated by the configuration information,
   wherein the configuration information of the power saving signal comprises at least one of following:
   time-domain location information of transmission of the power saving signal;
   a time offset between a monitoring position of the power saving signal and a system frame number 0 and/or a slot start position;
   a duration of transmission of the power saving signal;
   a timing advance between a monitoring position of the power saving signal and a monitoring position of a downlink control channel;
   frequency-domain position information of transmission of the power saving signal;
   an effective time duration of the power saving signal;
   a duration of monitoring a downlink control channel,
   wherein whether to monitor a downlink control channel is determined by the terminal according to whether the power saving signal is monitored.

7. The method according to claim 6, wherein sending the configuration information of the power saving signal comprises:
   sending a broadcast message, wherein the broadcast message comprises the configuration information of the power saving signal; or,
   sending a dedicated signaling comprising the configuration information of the power saving signal.

8. The method according to claim 7, wherein, before sending the broadcast message, the method further comprises:
   receiving a request message sent by a terminal, wherein the request message is used for requesting the network-side device to send the configuration information of the power saving signal.

9. The method according to claim 7, wherein before sending the dedicated signaling comprising the configuration information of the power saving signal, the method further comprises:
   sending a first capability request message to a terminal;
   receiving a power saving capability of the terminal reported by the terminal according to the first capability request message; wherein the power saving capability of the terminal comprises at least one of following:
   whether the terminal supports reception of a power saving signal;
   whether the terminal supports a power saving operation;

whether the terminal supports periodic reception of a power saving signal;
whether the terminal supports continuous monitoring of a power saving signal;
whether the terminal supports deep sleep;
configuring the power saving signal for the terminal according to the power saving capability of the terminal;
or,
before sending the dedicated signaling comprising the configuration information of the power saving signal, the method further comprises:
sending second capability request information to a core network, wherein the second capability request information carries identification information of the terminal;
receiving a power saving capability of the terminal sent by the core network according to the second capability request message; wherein the power saving capability of the terminal comprises at least one of following:
whether the terminal supports reception of a power saving signal;
whether the terminal supports a power saving operation;
whether the terminal supports periodic reception of a power saving signal;
whether the terminal supports continuous monitoring of a power saving signal;
whether the terminal supports deep sleep;
configuring the power saving signal for the terminal according to the power saving capability of the terminal.

10. The method according to claim 6, wherein
the configuration information of the power saving signal further comprises at least one of following:
identification information of the power saving signal;
a cell group identification list to which the configuration information is applicable;
a distribute unit identification list to which the configuration information is applicable;
a minimum threshold value of a signal quality of an effective power saving signal.

11. A network-side device, comprising:
a transceiver, a storage, a processor, and a program stored on the storage and executable by the processor;
wherein the processor is configured to read a program in the storage and control the transceiver to perform steps of the method of configuring a power saving signal according to claim 6.

12. A terminal, comprising:
a transceiver, a storage, a processor, and a program stored on the storage and executable by the processor;
wherein the transceiver is configured for receiving configuration information of a power saving signal, wherein the configuration information is at least used for indicating a resource location of the power saving signal;
the processor is configured to read a program in the storage and perform a step of monitoring the power saving signal at the resource location indicated by the configuration information,
wherein the configuration information of the power saving signal comprises at least one of following:

time-domain location information of transmission of the power saving signal;
a time offset between a monitoring position of the power saving signal and a system frame number 0 and/or a slot start position;
a transmission duration of the power saving signal;
a timing advance between a monitoring position of the power saving signal and a monitoring position of a downlink control channel;
frequency-domain position information of transmission of the power saving signal;
an effective time duration of the power saving signal;
a time duration of monitoring the downlink control channel,
wherein the processor is further configured for determining whether to monitor a downlink control channel according to whether the power saving signal is monitored.

13. The terminal according to claim 12, wherein the transceiver is further configured for:
receiving a broadcast message sent by the network-side device, wherein the broadcast message comprises the configuration information of the power saving signal;
or,
receiving a dedicated signaling sent by the network-side device, wherein the dedicated signaling comprises the configuration information of the power saving signal.

14. The terminal according to claim 13, wherein the transceiver is further configured for sending a request message to the network-side device before receiving the broadcast message sent by the network-side device, wherein the request message is used for requesting the network-side device to send the configuration information of the power saving signal.

15. The terminal according to claim 13, wherein the transceiver is further configured for:
receiving a first capability request message sent by the network-side device;
reporting a power saving capability of the terminal to the network-side device according to the first capability request message;
wherein the power saving capability of the terminal comprises at least one of following:
whether the terminal supports reception of a power saving signal;
whether the terminal supports a power saving operation;
whether the terminal supports periodic reception of a power saving signal;
whether the terminal supports continuous monitoring of a power saving signal;
whether the terminal supports deep sleep.

16. The terminal according to claim 12, wherein the configuration information of the power saving signal further comprises at least one of following:
identification information of the power saving signal;
a cell group identification list to which the configuration information is applicable;
a distribute unit identification list to which the configuration information is applicable;
a minimum threshold value of a signal quality of an effective power saving signal.

* * * * *